J. A. BARBOUR.
VALVE.
APPLICATION FILED SEPT. 19, 1911.
1,024,877.
Patented Apr. 30, 1912.
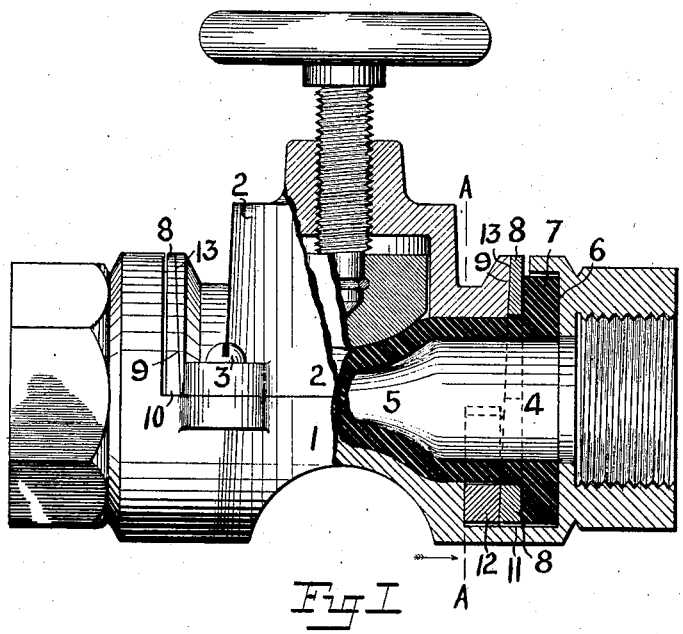
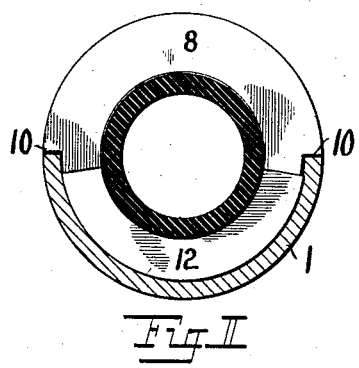
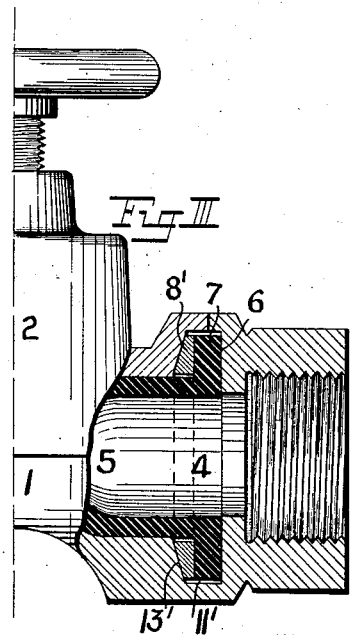
WITNESSES
INVENTOR
JAMES ALEXANDER BARBOUR
By
Attorney

UNITED STATES PATENT OFFICE.

JAMES ALEXANDER BARBOUR, OF JOHANNESBURG, TRANSVAAL.

VALVE.

1,024,877. Specification of Letters Patent. Patented Apr. 30, 1912.

Application filed September 19, 1911. Serial No. 650,154.

*To all whom it may concern:*

Be it known that I, JAMES ALEXANDER BARBOUR, a British subject, residing at Johannesburg, in the Province of the Transvaal, Union of South Africa, have invented new and useful Improvements in Valves, of which the following is a specification.

The present invention relates to valves comprising a rigid casing and a soft rubber or like resilient liner therefor which is squeezed to control the flow of fluid through the valve.

The purpose of the invention is to provide improved means for jointing the ends of the liner with the casing.

According to this invention, the liner is formed with flanged ends which are forced against similar seatings formed on the casing. Behind the flanges are rigid rings having inclined rear faces which coöperate wedgewise with the adjacent parts to force the rings and flanges to the seatings.

In the accompanying drawings: Figure I is a partial longitudinal section of a valve fitted with one form of the invention. Fig. II is a section on A—A Fig. I viewed from the direction of the arrow, the cover of the casing being removed. Fig. III is a similar view to Fig. I showing a modification.

Referring to Figs. I and II, 1 is a rigid metallic valve casing comprising a detachable cover 2; the division being made on a diametral plane. The cover is retained in place by screws 3 by which it may be forcibly brought into position. The casing is suitably formed at its ends for attachment where required. The ends 4 of rubber liner 5 are preferably flat and engage seatings 6 on the casing. Said ends are formed with flanges 7 behind each of which is a rigid ring 8 which is of uniformly increasing thickness from the top adjacent to the cover 2, to the bottom, so presenting its rear face 9 inclined to the axis of the valve. It is formed with two shoulders 10 which prevent it from turning by engaging the casing, as seen in Fig. II. The lower part of the ring 8 is entered into a recess 11 in the casing. A half ring 12 is afterward forced into the recess behind the ring from the mouth of the recess as indicated by the arrow Fig. II, whereby it wedges out the lower and thicker part of the ring and so forces the lower part of the end face 4 of the liner into close contact with its seating 6. The end faces 13 of the cover are inclined downwardly toward each other and correspond with the rear faces 9 of the rings, so that when the cover is placed in position and forced home by means of screws 3 it exerts a wedging action on the upper parts of the rings.

In the modification shown in Fig. III, the half rings 12 are dispensed with and the rings 8′ are made uniformly of outwardly tapering cross section, as shown. The recesses 11′ in the casing and the end faces 13′ of the cover are of corresponding form, so that as the cover is forced home it simultaneously forces the rings 8′ into the recesses 11′ and also exerts a wedging action upon them with its inclined faces 13′ whereby the rings are wedged outwardly to bring the ends of the liner firmly to their seating, as before.

I claim, in a valve,

1. The combination of a casing comprising a separable cover, a resilient liner therein having flanged ends, the casing providing seatings for said ends, and rigid rings behind the flanges having inclined rear faces coöperating wedgewise with adjacent parts to force the rings and flanges toward the seatings.

2. The combination of a casing comprising a separable cover formed with inclined faces, a resilient liner therein having flanged ends, the casing providing seatings for said ends, and rigid rings behind the flanges having inclined rear faces coöperating wedgewise with adjacent parts including the aforesaid inclined faces of the cover, to force the rings and flanges toward the seatings.

3. The combination of a casing comprising a separable cover formed with inclined faces, a resilient liner therein having flanged ends, the casing providing seatings for said ends, rigid rings behind the flanges having inclined rear faces and bodies forced between said rear faces of the rings and the casing proper, said rear faces of the rings coöperating wedgewise with said bodies and the inclined faces of the cover to force the rings and flanges toward the seatings.

4. The combination of a casing comprising a separable cover formed with inclined faces, a resilient liner therein having flanged ends, the casing providing seatings for said ends, rigid rings behind the flanges, said rings being of increasing thickness from the top adjacent to the cover to the bottom, and bodies forced between the bottoms of the rings and the casing proper, said rear faces of the rings coöperating wedgewise with said bodies and the inclined faces of the cover to force the rings and flanges toward the seatings.

In testimony whereof I have signed my name to this specification in the presence of two subscribing witnesses.

JAMES ALEXANDER BARBOUR.

As witnesses:
BERNARD PULLIN,
L. F. HELLIER.

Copies of this patent may be obtained for five cents each, by addressing the "Commissioner of Patents, Washington, D. C."